UNITED STATES PATENT OFFICE.

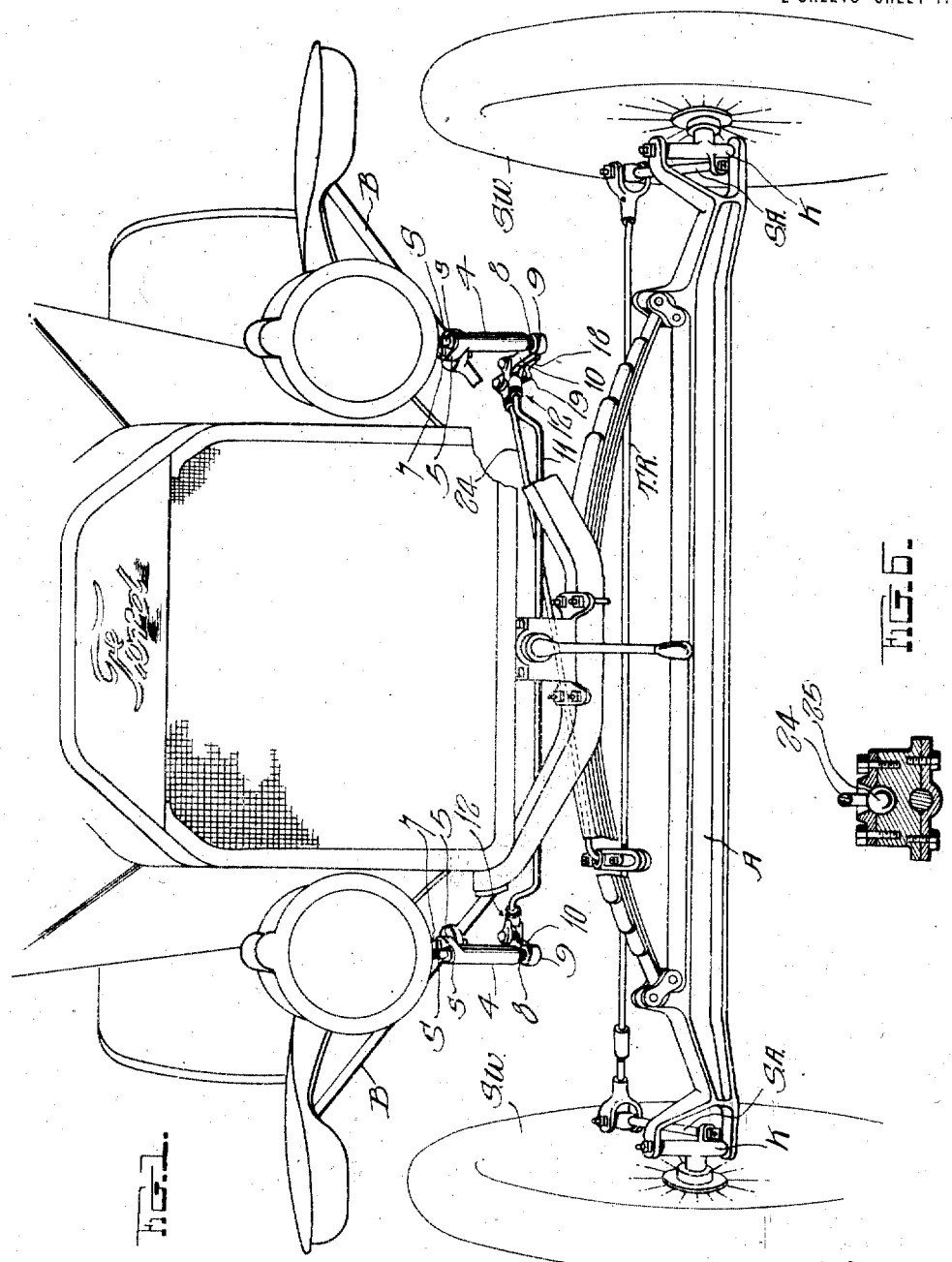

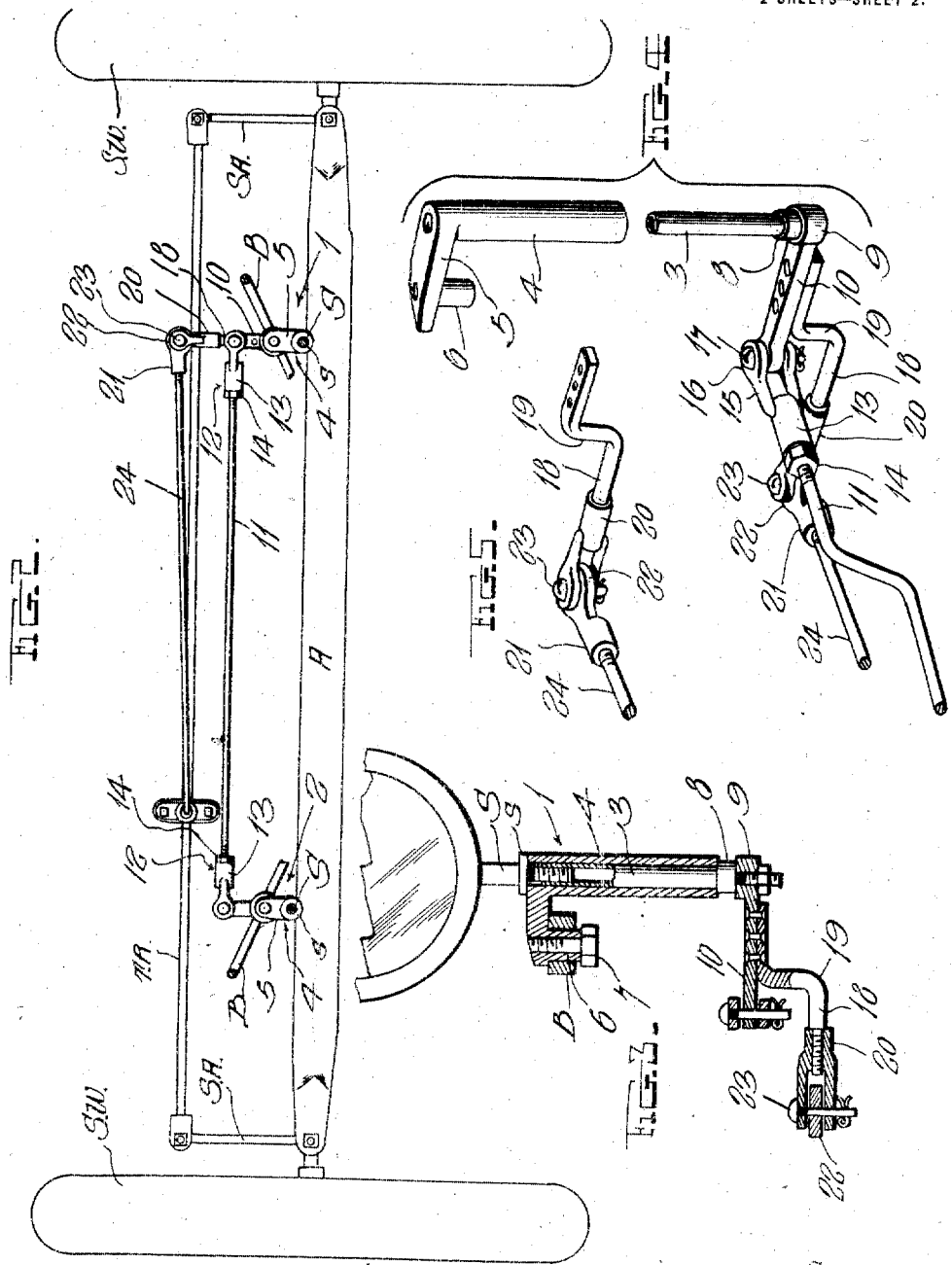

EVA M. LYON, OF ESCONDIDO, CALIFORNIA.

DIRIGIBLE HEADLIGHT FOR VEHICLES.

1,233,078.  Specification of Letters Patent.  Patented July 10, 1917.

Application filed January 2, 1917. Serial No. 140,170.

*To all whom it may concern:*

Be it known that I, EVA M. LYON, a citizen of the United States, residing at Escondido, in the county of San Diego and State of California, have invented certain new and useful Improvements in Dirigible Headlights for Vehicles; and I do declare the following to be a full, clear, and exact description of the invention, such as will enable others skilled in the art to which it appertains to make and use the same.

This invention relates to headlights mounted to turn with the steering wheels of a mechanically propelled vehicle so that the roadway may be lighted in advance of the vehicle when rounding a curve or turning a corner.

The object of the invention is to provide a simple and efficient device of this character for use in connection with Ford cars, which may be quickly and readily applied by an inexperienced person without in any way altering the car.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a front elevation of a Ford automobile equipped with this improvement;

Fig. 2 is a top plan view of the attachment shown applied with the lamp posts in section;

Fig. 3 is a detail sectional view of the attachment at the driving side of the car;

Fig. 4 is a detail perspective view thereof with the parts in juxtaposition ready for assembling;

Fig. 5 is a detail perspective view showing the connection of link 24 and arm 18; and Fig. 6 is a vertical transverse section through the ball and socket connection of link 24 and transverse rod T R.

The lamp operating mechanism constituting this invention is designed for use in connection with Ford automobiles, and in the embodiment illustrated a Ford car is shown equipped therewith, A representing the front axle upon the ends of which the steering wheels S W are mounted in the usual manner. The knuckles K of the steering wheels are provided with the usual steering arms S A which are connected by the transverse rod T R so that the wheels are simultaneously turned in the operation of the steering mechanism. This steering mechanism includes an arrangement of steering gear commonly used on Ford cars.

The lamp controlling mechanism constituting this invention includes two lamp supports 1 and 2 which are exactly alike and hence one only will be described in detail. The support 1 is in the form of a tube 3, the upper end of which is internally threaded for engagement with the lower end of the stem S of the ordinary headlight of a Ford car which is removed from the bracket B in which it is usually mounted and engaged with this tube 3. This tube 3 is mounted in a tubular casting 4 which has a laterally extending arm 5 at its upper end provided with a depending tubular stud 6 which is designed to be inserted in the opening in the lamp bracket B from which the bracket stem of the lamp is removed so that the lamp when engaged with this device will be positioned about an inch and one-half more or less from the position which it usually occupies and in advance thereof to provide for the turning of the lamp without contacting with the radiator of the car. The stud 6 is internally threaded and is secured to the bracket B by a bolt 7 as is shown clearly in Fig. 3. The casting 4 loosely receives the tube 3 and said tube is provided at its lower end with a collar 8 against which the lower end of the casting 4 abuts. This collar 8 is preferably made integral with the tube 3 and is spaced from the lower end thereof, said end being reduced in size from said collar to its terminal, and is designed for insertion through an eye 9 in an arm 10 and is held in engagement therewith by a nut threaded on said reduced end.

It is of course understood that the parts above described are all duplicated at the opposite side of the car to provide for the mounting of the two headlights, and the arms 10 are connected at their free ends which extend rearwardly from the lamp supporting posts by a connecting rod 11, the main or body portion of which is offset downwardly to provide for its proper positioning below the radiator of the car. This rod 11 is connected at its opposite ends with the arms 10 by adjustable couplings 12. These couplings 12 are each here shown in the form of a tubular interiorly threaded socket 13 which has threaded engagement with one end of the rod 11 and is held in adjusted position thereon by a lock nut 14. Extending longitudinally from the outer end of the socket 13 are two vertically spaced arms 15 provided at their free ends with eyes 16 which form bearings for a bolt 17, said bolt passing through the eyes 16 and through the eye 9 of arm 10 which is disposed between the arms 15 of the socket member, thereby pivotally connecting the arms 10 with the connecting rod 11, it being understood that the connections are the same at both ends of said rod. This connection of the arms 10 by the rod 11 provides for the simultaneous turning of the two headlights.

Rigidly secured to the arm 10 at the drive side of the car is an arm 18 which is offset downwardly intermediately of its ends as shown at 19, the front portion of which projects some distance beyond the end of arm 10 and is provided with a socket member 20 similar to the sockets 13 which connect arms 10 with the connecting rod 11, and by means of which said socket member is adjustable on said arm 18. A coöperating connecting coupling 21 has an eye 22 disposed between the eye carrying arms of the socket member 20 and is pivotally connected therewith by a bolt 23. This coupling 21 is threaded on the end of a link or rod 24, the free end of which has a ball 25 extending laterally therefrom and which forms one member of a ball and socket connection which unites the link 24 to the transverse rod T R which connects the steering wheels.

The socket member with which the ball 25 is engaged is adjustably clamped to the steering or connecting bar T R.

The distance from center of arm 10 at the drive side of the car, and the connection between the end of arm 18 and link 24 is preferably one inch shorter than the length of the steering arms S A of the car, which provides for the turning of the lights approximately two inches farther than the steering wheels when the latter are actuated.

The use of the ball and socket joint in connection with the link which is attached directly to the arm of the lamp post at the drive side of the car permits any spring to be taken up by said joint.

To install this attachment on a Ford car all that is necessary is to unscrew the nuts from the lamp stems, remove the stems from the brackets which usually support them, and drive into the bearings in said brackets from which the lamp stems were removed the studs 6 of the castings 4 and secure them in position by the bolts 7. The tubes 3 are then entered in the casting 4 and screwed onto the stems of the lamp, which stems are provided with annular shoulders s and these shoulders rest and turn on the tops of the castings 4. The lower ends of the tubes 3 are then inserted through the eyes in the free ends of the arms 10 and held in connection therewith by the nuts which are threaded on the lower ends of said tubes beyond said arms. Connecting rod 11 is then engaged with the arms 10 by the bolts 17 in the manner above described, and the two lamps are connected to turn synchronously. The ball and socket connection of the link 24 is then properly positioned on the transverse connecting rod T R and securely clamped thereto, and the lights are then ready for use.

From the above description it will be obvious that no vibration will occur in this device, but should there be any, it may be readily taken up with a lock washer mounted on the bottom of the tube 3 between the arm 10 and the nut on said tube.

From the foregoing description taken in connection with the accompanying drawings, the advantages of the construction and the method of operation will be readily apparent to those skilled in the art to which the invention appertains, and while I have described the principle of operation of the invention together with the device which I now consider to be the best embodiment thereof, I desire to have it understood that the device shown is merely illustrative and that such changes may be made as are within the scope of the claimed invention.

I claim:

1. The combination with a vehicle having a steering mechanism and a lamp supporting bracket provided with an opening extending vertically therethrough, of a tubular casting having an arm extending laterally from one end and provided with an extension arranged parallel with said tubular casting, said extension being mounted in said bracket opening to position said casting laterally in said bracket with its body portion below the bracket, a lamp carrying member mounted to turn in said casting and projecting beyond its lower end, a collar on the projecting end of said member spaced slightly above its terminal and forming a stop to limit the insertion of said member in said casting, a lamp having a post extending into the upper end of said casting and detachably secured therein to turn with said member, said post having a shoulder resting and turning on said casting, a laterally extending arm rigidly secured to the projecting end of said lamp carrying member below the collar thereon, and a connection between said arm and the steering mechanism whereby to turn said lamp.

2. The combination in an automobile with a tubular lamp bracket carried thereby, of a substantially tubular lamp post rotatably mounted in said bracket and having a closed lower end provided with a reduced downwardly extending terminal portion, a collar formed on said post and spaced from its lower terminal to limit the insertion of the post in the bracket, a lamp carrying stem to be detachably fastened in the upper end of said post and turned therewith, said stem having an annular shoulder thereon to engage the upper end of said bracket and support the lamp, an arm secured on the reduced portion of said post, and a connection between said arm and the steering mechanism of the automobile to turn said lamp.

3. The combination in an automobile having steering arms operatively connected by a transverse rod and a lamp carrying post rotatably mounted in a bracket on the automobile and projecting below said bracket, of a laterally and rearwardly extending arm secured at one end to the lower end of said post, the other end of said arm being adapted for operating connection with another lamp carrying post, a longitudinally offset crank arm secured to the first named arm and projecting longitudinally beyond its rear end to form a continuation thereof, said crank and first-named arms being shorter in total length than the steering arm of the automobile, and a substantially transversely extending connecting rod between said crank arm and the transverse rod of the steering mechanism, whereby to turn the lamp on said post in advance of the wheels of the automobile.

In testimony whereof I have hereunto set my hand in the presence of two subscribing witnesses.

EVA M. LYON.

Witnesses:
O. R. MAYNARD,
L. N. TURRENTINE.